US 8,630,799 B2

(12) United States Patent
Smid

(10) Patent No.: US 8,630,799 B2
(45) Date of Patent: Jan. 14, 2014

(54) OPTICAL NAVIGATION AID WITHIN A BEACON FIELD

(76) Inventor: G. Edzko Smid, Oakland Township, MI (US)

(*) Notice: Subject to any disclaimer, the term of this patent is extended or adjusted under 35 U.S.C. 154(b) by 100 days.

(21) Appl. No.: 13/271,667

(22) Filed: Oct. 12, 2011

(65) Prior Publication Data
US 2012/0089323 A1 Apr. 12, 2012

Related U.S. Application Data

(60) Provisional application No. 61/392,323, filed on Oct. 12, 2010.

(51) Int. Cl.
*G01C 21/04* (2006.01)
(52) U.S. Cl.
USPC .......................................................... 701/408
(58) Field of Classification Search
USPC .......................................................... 701/408
See application file for complete search history.

(56) References Cited

U.S. PATENT DOCUMENTS

| 5,861,846 | A | 1/1999 | Minter |
| 6,097,315 | A | 8/2000 | Minter |
| 6,266,142 | B1 * | 7/2001 | Junkins et al. ................ 356/623 |
| 7,555,363 | B2 * | 6/2009 | Augenbraun et al. ......... 700/253 |
| 2007/0061043 | A1 * | 3/2007 | Ermakov et al. .............. 700/263 |
| 2010/0030380 | A1 * | 2/2010 | Shah et al. .................... 700/258 |
| 2011/0228099 | A1 | 9/2011 | Rakes |

FOREIGN PATENT DOCUMENTS

WO     WO 2009012474 A1 *    1/2009

OTHER PUBLICATIONS

Borenstein, et al., Where am I? Sensors and Methods for Mobile Robot Positioning, 1996, University of Michigan.*
iTrack, Autonomous Vehicle Controller, 2009.*

* cited by examiner

*Primary Examiner* — Mary Cheung
*Assistant Examiner* — Michael Berns
(74) *Attorney, Agent, or Firm* — Blue Filament Law PLLC; Avery N. Goldstein; Marc S. Balban

(57) ABSTRACT

A secondary optical system for object navigation in an array of beacons is provided that includes an optical source having at least one optical emitter emitting an optical signal and that is mounted to either the moving object or a beacon of the array of beacons. The moving object in simultaneous radio frequency communication the array of beacons to determine dynamic position of the object. An optical detector is mounted to the other of a moving object or the beacon of the array of beacons and the optical detector receives the optical signal when line of sight exists between the moving object and a beacon of the array of beacons. Electronics are provided for determining the dynamic position of the moving object uses weighting factor that favors the communication and at least two beacons of the array of beacons for which a moving object-beacon optical line of sight exists.

18 Claims, 3 Drawing Sheets

PRIOR ART Fig. 1

OPTICAL NAVIGATION AID WITHIN A BEACON FIELD

RELATED APPLICATIONS

This application claims priority benefit of U.S. Provisional application 61/392,323 filed Oct. 12, 2010; the contents of which are hereby incorporated by reference.

FIELD OF THE INVENTION

The present invention in general relates to navigation and in particular to a secondary optical system to simplify computation relating to object position within a beacon field.

BACKGROUND OF THE INVENTION

Determining the location of a moving object within a beacon field where beacons have known positions involves optimizing a vector solution for the position of the object relative to at least two beacons of the array. While numerous computational methodologies exist for triangulation or trilateration to determine range measurements of the object, a problem common to various methodologies is environmental signal interference that lessens the accuracy of object position. As object position accuracy is critical to achieving many of the efficiencies of autonomously operating robotic vehicles, many such applications have been hindered by the inability to inexpensively and accurately locate the moving object within a beacon field.

This problem is shown schematically with respect to prior art FIG. 1 where a moving object denoted at "A" is within an array of beacons denoted at B, C, E, H, and I. As shown graphically in prior art FIG. 1, it is appreciated that a beacon field would not always have uniform spacing between beacons within the array.

Each range measurement is acquired between two radios. The first radio on object A requests a range from radio beacon B. Radio beacon B responds to radio A, where the time of flight of the request-response sequence is used to determine the distance from A to beacon B. Likewise, an accurate time of flight measurement is obtained between A-H and A-I.

The range measurement is less accurate when the radio signals must penetrate objects in the line of sight between them. Radio beacon C receives a request from radio A. The range measurement is less accurate because the radio waves have to penetrate obstacle D.

In worse case scenarios, the signal travels indirectly between radio A and radio E, bouncing off the surface of object G. The resulting range measurement does not represent the distance between radios A and E anymore, yet in a conventional range measurement system inaccurate range measurement signals A-G-E and A-D-C are nonetheless used to compute object position.

Thus, there exists a need for a system and process for discounting accurate inputs associated with obstacle impaired beacons and determining range measurement for a moving object within a beacon field. There further exists a need for such a system that is robust and inexpensive to implement, as well as being potentially used by multiple objects navigating within the beacon field.

SUMMARY OF THE INVENTION

A secondary optical system for object navigation in an array of beacons is provided that includes an optical source having at least one optical emitter emitting an optical signal and that is mounted to either the moving object or a beacon of the array of beacons. The moving object in simultaneous radio frequency communication with at least two beacons of the array of beacons is used to determine dynamic position of the object. An optical detector is mounted to the other of a moving object or the beacon of the array of beacons relative to the optical source, the optical detector receives the optical signal when line of sight exists between the moving object and a beacon of the array of beacons. Electronics are provided for determining the dynamic position of the moving object that uses a weighting factor that favors the communication of at least two beacons of the array of beacons for which a moving object-beacon optical line of sight exists.

DESCRIPTION OF THE INVENTION

The present invention has utility as a system for object navigation and a process for improving range accuracy of the object within a beacon field. The present invention involves mounting of interactive optical sources and optical receivers between the moving object and the beacons such that, for example, the moving object A mounts an optical source and each of the beacons of a beacon field mounts an optical receiver, or vice versa. Optical signals emitted from an optical emitter of the optical source interact with an optical receiver and thereby establish line of sight between the moving object and a specific beacon. Upon computing ranging for the moving object within the beacon field, the data associated with a line of sight beacon is given a positive weighting function that in the extreme instance constitutes the only data used to calculate object range measurement. While line of sight determination is accomplished with radio frequencies, the equipment and computation associated with radio frequency line of sight determination is complex and as a result unreliable.

While the present invention is further detailed with an optical source containing at least one optical emitter mounted to moving object A, optical receivers associated with each of the beacons of the beacon field, it is appreciated that the reverse positioning with light sources associated with each of the beacons and an optical receiver associated with moving object A, or a combination thereof, is equally operative herein.

Figure 1:
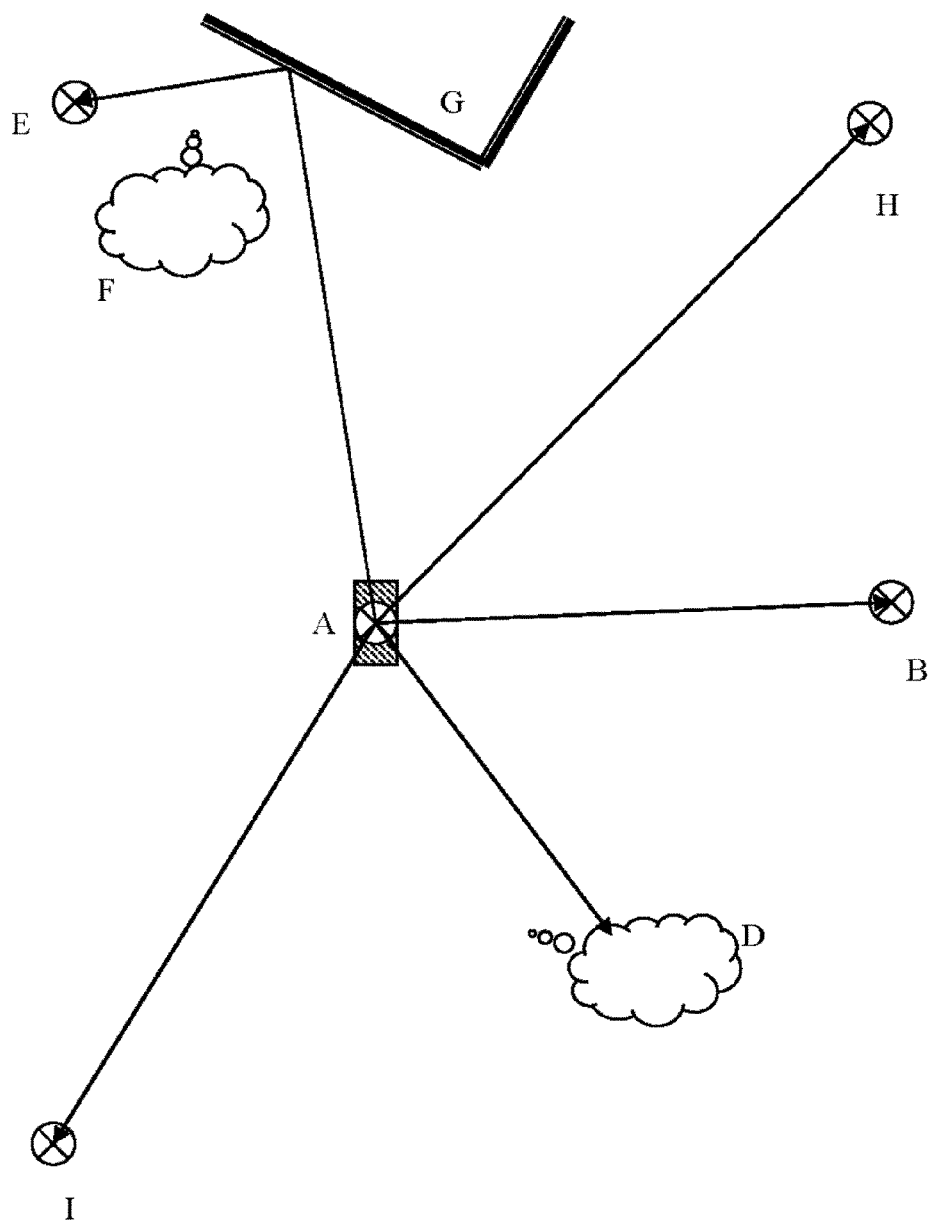
FIG. 1 is an overhead prior art schematic depicting a moving object denoted at A within a beacon field in which several of the beacons are obscured by obstructions.
Figure 2:
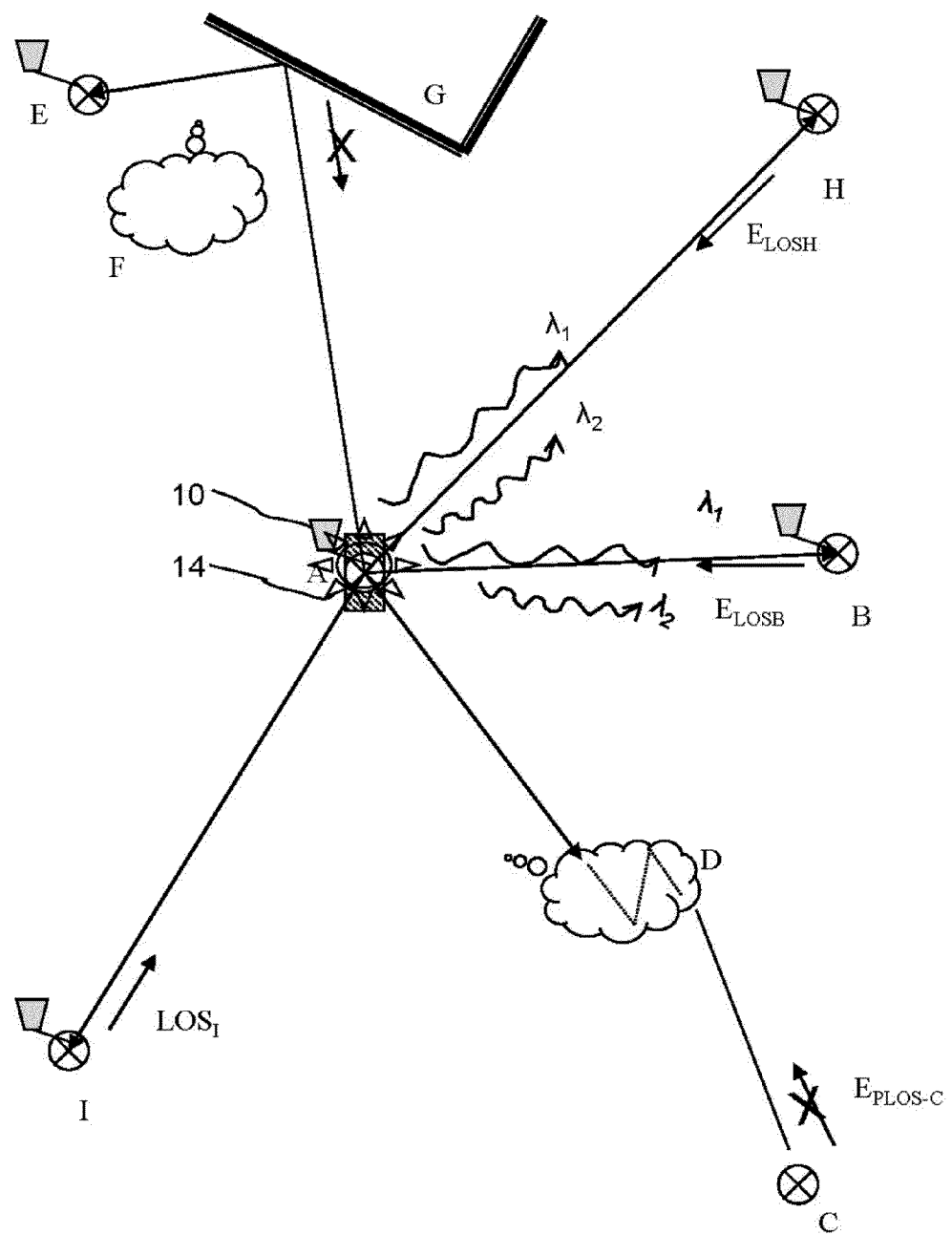
FIG. 2 is a schematic depicting an inventive system and process for optical line of sight confirmation that the moving object A has direct line of sight with a given beacon.
Figure 3:
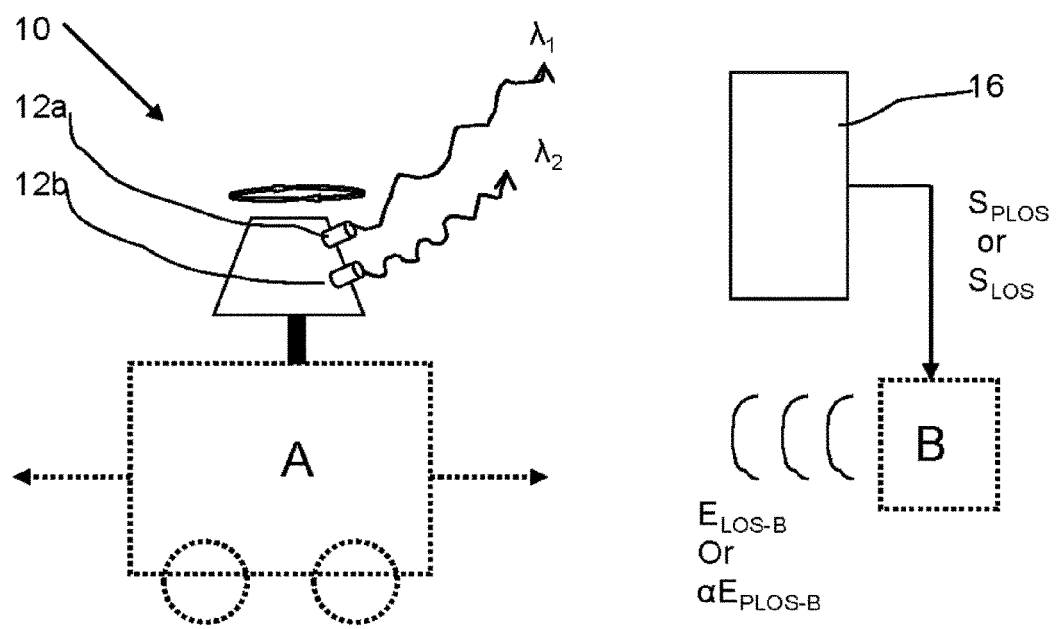
FIG. 3 is an operational schematic between an optical source and optical receiver of an inventive system per FIG. 2.

Referring now to FIGS. 2 and 3, an omnidirectional optical source 10 is provided that includes at least one optical emitter. For the optical source 10 to afford omnidirectional light emission it is appreciated to include either fixed array optical emitters such as light emitting diodes (LEDs) or lasers circumferentially decorating the exterior of moving object A, or alternatively an angularly limited optical emitter is rotated to achieve omnidirectional emission. It is appreciated that based on elevation differences between a moving object and beacons within a beacon field, that preferably omnidirectional emission is not merely planar but rather encompasses a hemispherical emission range. Preferably, a rotating light source 10 is mounted above the chassis of moving object A, as depicted in FIG. 3. An optical source 12a or 12b is each independently a laser or an LED, a cold cathode ray tube, each operating in continuous emission or pulsed emission modes. The optical source 10 is depicted visually as having omnidirectional emission at 14. In the simplest embodiment of the present invention, a single optical source 12a is provided that emits a single wavelength $\lambda_1$ that an optical detector 16 associated with a given beacon B is able to detect. Upon the optical receiver 16 sensing $\lambda_1$, thereby indicating line of sight between the moving object A and the exemplary beacon B, photodetector 16 emits a signal $S_{LOS}$ denoting line of sight to the beacon B. In the simplest embodiment of the present invention, the beacon B is activated to transmit a signal indicative of receiving line of sight emission from an optical emitter 12a, signal $S_{LOS}$ such that position of object A is only calculated when line of sight exists relative to beacon B. A distinction of the present invention is that the signal of line of sight, $S_{LOS}$, is not used to calculate actual range measurement itself but rather operate as a switch or a weighting function for communication between a ranging signal with the moving object.

It is appreciated that multiple moving objects A simultaneously can navigate within a beacon field. Each of such moving objects A can operate with the same emission wavelength, $\lambda_1$, or alternatively, each moving object has a characteristic emission wavelength to facilitate beacon field operation for such purposes as, for example, collision avoidance between simultaneously moving objects.

Optionally, an optical source 10 includes a second optical emitter 12b having different emission characteristics relative to optical emitter 12a with the emission characteristics differing in at least one of: wavelength, pulse rate, or intensity. It is appreciated that noncontinuous optical emission, dual peak wavelength optical emitters, or a combination thereof are advantageous in reducing interference associated with solar emission and atmospheric effects, and further affords the ability to distinguish multiple moving objects A within the beacon field. A peak wavelength operative herein varies between 300 and 800 nanometers. In instances when the difference between peak wavelengths $\lambda_1$ and $\lambda_2$ is at least 50 nanometers and a dual emitter optical source is present, it is noted that while one such wavelength potentially reflected between moving object A and beacon E, or similarly a wavelength penetrating obstruction D to arrive at beacon C is possible, the likelihood of conditions being present for two disparate wavelengths of a separation of at least 50 nanometers is highly unlikely. Optionally, photodetector 16 secured to a beacon is configured to communicate a signal to the beacon indicative of such a partial line of sight (PLOS). With receipt of a signal of partial line of sight, $S_{PLOS}$, a beacon is selected to either broadcast no signal for trilateral range measurement for the moving object A or a weighted emission $\alpha E_{PLOS}$ that communicates that the measurement value coming from such a beacon should be discounted in terms of weighting relative to a true line of sight emission, where $\alpha$ represents a discounted weighting value of greater than zero and less than 1 where of 1 denotes LOS. These situations are shown graphically in FIGS. 2 and 3 where $E_{LOS-X}$ denotes a beacon emission indication of line of sight where X denotes the letter ascribed to a beacon and $\alpha E_{PLOS}$ denotes a discounted weighting of an emission associated with partial line of sight-X where X denotes the letter assigned to a given beacon. The emissions E are typically radiofrequency transmissions of between 0.8 and 2400 gigahertz. These radio emissions are used to calculate ranging for the moving object A while the optical line of sight system detailed herein simply provides weighting to the beacon emissions for computation of object position. As a result, the inventive optical system is simple in construct and robust.

An inventive system and process are particularly well suited for the operation of robotic vehicles such as tractors, lawnmowers, sentry robots, and sample collection robots. Autonomous vehicle operation and the ability to follow a predetermined transit program or to follow an optimization routine is greatly facilitated by the ability afforded by the present invention to accurately determine and log position within a beacon field and is facilitated by a simple optical adjunct system confirmation of line of sight between the moving object and a given beacon of a beacon field.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof are intended to define the scope of the invention.

The invention claimed is:

1. A secondary optical system for weighing measurements in radio frequency object navigation in an array of beacons comprising:
   an optical source having at least one optical emitter emitting an optical signal and mounted to either the moving object or a beacon of the array of beacons, the moving object in simultaneous radio frequency communication with at least two beacons of the array of beacons to determine dynamic position of the object;
   an optical detector mounted to the other of a moving object or the beacon of the array of beacons relative to said optical source, said optical detector receiving the optical signal when line of sight exists between the moving object and a beacon of the array of beacons; and
   electronics for determining the dynamic position of the moving object by radio frequency signals that uses a weighting factor that favors the communication of at least two beacons of the array of beacons for which a moving object-beacon optical line of sight exists.

2. The system of claim 1 wherein said optical source is mounted to the moving object and a plurality of optical detectors are deployed on the array of beacons.

3. The system of claim 1 wherein the optical signal has a wavelength between 300 and 800 nanometers.

4. The system of claim 1 wherein the optical signal is pulsed.

5. The system of claim 1 wherein said optical source is a laser or light emitting diode.

6. The system of claim 1 wherein the optical signal is monochromatic.

7. The system of claim 1 wherein the optical signal is emitted omnidirectionally.

8. The system of claim 7 wherein said optical source comprises a plurality of light emitting elements surrounding the periphery of the moving object.

9. The system of claim 7 wherein said optical source rotates to achieve omnidirectional emission.

10. The system of claim 1 wherein the communication between the moving object and the at least two beacons of the array is radio frequency communication.

11. The system of claim 1 wherein the weighting factor for line of sight is 1 and 0 for a non-line of sight orientation between the object and a beacon of the array of beacons.

12. The system of claim 1 further comprising a second optical emitter within said optical source, said second optical emitter emitting a second optical signal that varies from the optical signal in at least one of peak wavelength, pulse rate, and intensity.

13. The system of claim 12 wherein said optical detector communicates discounted weighting factor to the moving object when the optical signal is detected and the second optical signal is not detected.

14. A process for object navigation in an array of beacons comprising:
    deploying an array of beacons, each with an optical source comprising an optical emitter, emitting an optical signal, or an optical detector for detecting the optical signal;
    operating a moving object within the array of beacons, the moving object deploying the other of said optical source or said optical detector relative to the array of beacons; and
    computing a dynamic position of the moving object based on radio frequency communication between the object and at least two of the beacons of the array based on a weighting factor in favor of communication with beacons for which moving object-beacon optical line of sight exists.

15. The process of claim 14 further comprising rotating the optical source such that the optical signal is emitted omnidirectionally.

16. The process of claim 14 wherein the weighting factor for line of sight is 1 and 0 for a moving object-obstructed beacon lack of line of sight.

17. The process of claim 14 wherein said optical source is mounted to the moving object and said optical detector is mounted to a beacon of the array of beacons.

18. The process of claim 14 further comprising emitting a second optical signal to said optical detector, the second optical signal varying from the optical signal in at least one of peak wavelength, pulse rate, and intensity.

* * * * *